(12) United States Patent
Tange et al.

(10) Patent No.: US 10,370,263 B2
(45) Date of Patent: Aug. 6, 2019

(54) BALLAST WATER TREATMENT DEVICE

(71) Applicant: MIURA CO., LTD., Ehime (JP)

(72) Inventors: Tomoaki Tange, Ehime (JP); Akinori Kawakami, Ehime (JP)

(73) Assignee: MIURA CO., LTD., Ehime (JP)

( * ) Notice: Subject to any disclaimer, the term of this patent is extended or adjusted under 35 U.S.C. 154(b) by 156 days.

(21) Appl. No.: 15/450,746

(22) Filed: Mar. 6, 2017

(65) Prior Publication Data

US 2017/0174531 A1 Jun. 22, 2017

Related U.S. Application Data

(63) Continuation-in-part of application No. 15/253,171, filed on Aug. 31, 2016, which is a continuation of (Continued)

(51) Int. Cl.
*B01D 35/147* (2006.01)
*C02F 1/00* (2006.01)
(Continued)

(52) U.S. Cl.
CPC .............. *C02F 1/008* (2013.01); *B63J 4/002* (2013.01); *C02F 1/004* (2013.01); *C02F 1/325* (2013.01);
(Continued)

(58) Field of Classification Search
CPC .. C02F 1/001; C02F 1/008; C02F 1/32; C02F 1/325; C02F 2209/40; C02F 2103/008;
(Continued)

(56) References Cited

U.S. PATENT DOCUMENTS 3,937,662 A 2/1976 Bartik
3,999,566 A * 12/1976 Iwata .................. E02F 7/04
137/1

(Continued)

FOREIGN PATENT DOCUMENTS

EP 2394962 A1 12/2011
JP 10-109090 4/1998
(Continued)

OTHER PUBLICATIONS

Office Action dated Jun. 3, 2019 in U.S. Appl. No. 15/253,171, 15 pages.

*Primary Examiner* — Joseph W Drodge
(74) *Attorney, Agent, or Firm* — Muncy, Geissler, Olds & Lowe, P.C.

(57) ABSTRACT

A ballast water treatment device attached to a vessel provided with: a line (1) through which drawn treatment target water flows; and a ballast tank (5) connected to a downstream side of the line (1). The ballast water treatment device is provided with: a filter (3) which is disposed in the line (1) and which filters the treatment target water; and a controller (7). The controller (7) causes the treatment target water to be discharged outboard from an upstream side of the filter (3) in an early stage of drawing of the treatment target water, until water quality is stabilized, and, when the water quality of treatment target water has stabilized, causes the filter (3) to filter the treatment target water. Thus, ballast water filtering can be efficiently performed.

14 Claims, 2 Drawing Sheets

Related U.S. Application Data application No. 14/388,170, filed as application No. PCT/JP2013/080158 on Nov. 7, 2013, now Pat. No. 9,475,566.

(51) Int. Cl.
    *C02F 1/32*     (2006.01)
    *B63J 4/00*     (2006.01)
    *C02F 103/00*     (2006.01)

(52) U.S. Cl.
    CPC .. *C02F 2103/008* (2013.01); *C02F 2201/326* (2013.01); *C02F 2209/005* (2013.01); *C02F 2209/11* (2013.01); *C02F 2209/40* (2013.01); *C02F 2209/44* (2013.01); *C02F 2301/043* (2013.01); *C02F 2303/04* (2013.01)

(58) Field of Classification Search
    CPC ............ C02F 2303/04; C02F 2201/001; C02F 2201/008; C02F 2201/32; C02F 2209/11; C02F 2209/44; C02F 2209/005; C02F 2201/326; C02F 2301/043; C02F 1/004; B01J 4/002; B63J 4/00; B63J 4/002; B63J 4/02; B01D 35/02; B01D 35/147; B01D 36/00
    USPC ...... 210/87, 103, 130, 138, 241, 257.1, 258, 210/259, 192; 422/186.3; 250/432 R, 250/435

See application file for complete search history.

(56) References Cited

U.S. PATENT DOCUMENTS

| | | |
|---|---|---|
| 7,059,261 B2 | 6/2006 | Randall |
| 7,128,009 B2 | 10/2006 | Randall |
| 7,166,230 B2 | 1/2007 | Nilsen et al. |
| 8,025,795 B2 | 9/2011 | Miner et al. |
| 8,501,004 B2 | 8/2013 | Lee et al. |
| 8,980,103 B2 | 3/2015 | Lee et al. |
| 9,475,566 B2* | 10/2016 | Tange ................. B63J 4/002 |
| 9,929,512 B1* | 3/2018 | Trout ................ H01R 13/6588 |
| 2002/0153324 A1 | 10/2002 | Lynch |
| 2004/0026336 A1* | 2/2004 | Yuri ........................ C02F 1/004 |
| | | 210/748.11 |
| 2004/0134861 A1* | 7/2004 | Brodie .................... B63B 17/00 |
| | | 210/748.11 |
| 2004/0159599 A1 | 8/2004 | Hamann et al. |
| 2005/0155539 A1* | 7/2005 | Randall ................... B63B 13/00 |
| | | 114/125 |
| 2005/0178708 A1 | 8/2005 | Mark |
| 2006/0021951 A1* | 2/2006 | Leeuwen ............... B63B 13/00 |
| | | 210/760 |
| 2008/0190826 A1 | 8/2008 | Miner et al. |
| 2008/0277354 A1 | 11/2008 | Baerheim et al. |
| 2008/0283467 A1 | 11/2008 | Nguyen |
| 2010/0006490 A1 | 1/2010 | Fukuyo et al. |
| 2010/0116647 A1 | 5/2010 | Kornmuller et al. |
| 2010/0180810 A1 | 7/2010 | Liberg |
| 2011/0114569 A1* | 5/2011 | Kim ....................... C02F 1/4674 |
| | | 210/739 |
| 2011/0120956 A1 | 5/2011 | Ivanter et al. |
| 2015/0183663 A1* | 7/2015 | Kuik ......................... C02F 1/32 |
| | | 210/748.11 |

FOREIGN PATENT DOCUMENTS

| | | |
|---|---|---|
| JP | 2000-185280 | 7/2000 |
| JP | 2006-248510 A | 9/2006 |
| JP | 2006-263664 A | 10/2006 |
| JP | 2008-200590 A | 9/2008 |
| JP | 2011-255365 A | 12/2011 |
| JP | 2012-217966 A | 11/2012 |
| JP | 2013-23187 A | 2/2013 |
| JP | 2013-043143 A | 3/2013 |
| WO | WO 2012/061924 A1 | 5/2012 |

\* cited by examiner

BALLAST WATER TREATMENT DEVICE

CROSS REFERENCE TO RELATED APPLICATIONS

This application is a Continuation-in-Part of co-pending application Ser. No. 15/253,171, filed on Aug. 31, 2016, for which priority is claimed under 35 U.S.C. § 120; and this application is a Continuation of co-pending application Ser. No. 14/388,170 filed on Jan. 5, 2015, which is a U.S. National Stage of International Application No. PCT/JP2013/080158 filed on Nov. 7, 2013, for which priority is claimed under 35 U.S.C. § 120; and this application claims priority of Application No. PCT/JP2012/079250 filed in Japan on Nov. 12, 2012 under 35 U.S.C. § 119.

TECHNICAL FIELD

The present invention relates to a ballast water treatment device for treating ballast water stored on a vessel.

BACKGROUND ART

A vessel such as a tanker usually stores water called ballast water in a ballast tank provided on the vessel in order to balance the vessel under way while travelling toward another destination after unloading freight such as crude petroleum. Ballast water is normally charged at an unloading port and discharged at a loading port. If these ports are located at different places, microbes such as plankton and bacteria in the ballast water travel all over the world. When ballast water is discharged at a loading port in a sea area different from that of an unloading port, microbes in the other sea area are released at the loading port and may destroy the ecosystem in the sea area. In order to prevent such ballast water from destroying the marine environment, the International Maritime Organization (IMO) has entered into the International Convention for the Control and Management of Ships' Ballast Water and Sediments and has set a ballast water discharge standard to restrict the microbe content in ballast water discharged from ships.

This ballast water discharge standard sets the discharge limits for plankton according to sizes, specifically, at most 10 individuals/m$^3$ for plankton of 50 µm or more and at most 10 individuals/m$^3$ for plankton of 10 to 50 µm. The ballast water discharge standard also sets the discharge limits for bacteria, such as less than 250 cfu/100 ml for coliform.

Ballast water to be stored in a ballast tank is thus required to be treated by killing microbes and the like in the ballast water.

An ultraviolet treatment method has been known as a measure for treating ballast water by killing microbes and the like therein. According to this method, treatment target water drawn as ballast water is irradiated with ultraviolet (see Patent Literature 1, for example).

At an early stage of ballast water drawing, water around a vessel is shaken and sand or mud at the bottom of the sea is raised. As a result, in the filter, the efficiency of filtering of the treatment target water may be decreased by the influence of the rising sand or mud, or the filter may become clogged early. In this case, ballast water may flow into a ballast tank while treatment targets therein are killed insufficiently due to insufficient ultraviolet illuminance.

CITATION LIST

Patent Literature

Patent Literature 1: JP 2006-248510 A

SUMMARY OF INVENTION

Technical Problems

An object of the present invention is to provide a ballast water treatment device that efficiently filters ballast water.

Solution to Problem

In order to achieve the object mentioned above, the present invention provides a ballast water treatment device attached to a vessel including a ballast water treatment line through which drawn treatment target water flows, and a ballast tank connected to a downstream side of the ballast water treatment line. The ballast water treatment device includes a filter disposed in the ballast water treatment line to filter the treatment target water, and a controller. The controller causes the treatment target water to be discharged outboard from an upstream side of the filter in an early stage of drawing of the treatment target water, until water quality is stabilized, and causes the filter to filter the treatment target water when the water quality of treatment target water is stabilized.

Advantageous Effect of Invention

According to the ballast water treatment device of the present invention, the treatment target water is caused to be discharged outboard from the upstream side of the filter in the early stage of drawing of the treatment target water, until water quality is stabilized. When the water quality of treatment target water is stabilized, the filter is caused to perform filtering. Accordingly, filtering of the treatment target water can be efficiently performed.

DESCRIPTION OF EMBODIMENTS

A ballast water treatment device according to each of the embodiments of the present invention will now be described in detail with reference to the drawings.

Figure 1:
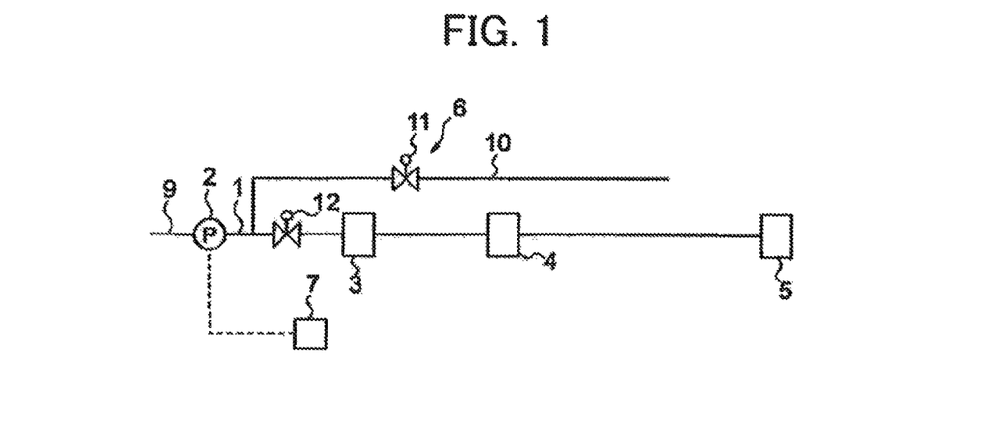
FIG. 1 is a schematic configuration diagram of a ballast water treatment device according to a first exemplary embodiment of the present invention.

A ballast water treatment device according to a first exemplary embodiment of the present invention is initially described with reference to the schematic configuration diagram in FIG. 1.

The ballast water treatment device according to the present exemplary embodiment includes, on a ballast water treatment line 1, a pump 2 for drawing and pressure feeding treatment target water, a filter 3, an ultraviolet reactor 4 for irradiating the drawn treatment target water with ultraviolet, a ballast tank 5 for storing treated water having been treated with ultraviolet, an outboard discharger 6, and a controller 7 having a control function of not passing treatment target water drawn for a predetermined period from the start of drawing treatment target water through the filter 3 and the ultraviolet reactor 4 but discharging outboard by the outboard discharger 6, stopping discharging outboard by the outboard discharger 6 at elapse of the predetermined period, and pouring into the ballast tank 5 treated water having been filtrated by the filter 3 and having been treated with ultraviolet by the ultraviolet reactor 4.

The controller 7 according to the present exemplary embodiment includes a timer (not shown) that checks a period elapsed from the start of drawing treatment target water.

The predetermined period from the start of drawing treatment target water is set as a period required for temporary increased turbidity because of rise of mud or sand due to drawing at the bottom of the sea (alternatively a lake, a river, or the like) around a drawing port called a sea chest (not shown) to decrease to turbidity at around a level before the start of drawing.

More specifically, the upstream ballast water treatment line 1 is provided with the pump 2, the filter 3, and the ultraviolet reactor 4 in the listed order from the upstream end. The pump 2 at the upstream end of the ballast water treatment line 1 is connected to a treatment target water drawing line 9 in the present exemplary embodiment. The ballast water treatment line 1 is connected, at an upstream portion of the filter 3, with an outboard discharge line 10 that bypasses the filter 3 and the ultraviolet reactor 4 and is used for discharging outboard drawn treatment target water. The outboard discharge line 10 is provided with an outboard discharge valve 11 serving as the outboard discharger 6. The ballast water treatment line 1 is provided with a treated water valve 12 that is located between the filter 3 and the outboard discharge line 10 connected to the upstream portion of the filter 3.

The controller 7 controls to open or close the outboard discharge valve 11 serving as the outboard discharger 6 and the treated water valve 12.

The ballast water treatment device thus configured according to the present exemplary embodiment treats treatment target water in the following manner.

Initially, the treated water valve 12 is closed, the outboard discharge valve 11 is opened, and the pump 2 is started. When the pump 2 is started, treatment target water flows to the outboard discharge line 10 and is discharged outboard by the outboard discharger 6 without passing though the filter 3 and the ultraviolet reactor 4.

When treatment target water starts being drawn, the timer provided to the controller 7 starts counting. When the timer checks elapse of the predetermined period from the start of drawing treatment target water, the treated water valve 12 is opened and the outboard discharge valve 11 is closed to stop discharging outboard treatment target water. Treatment target water passes through the filter 3 and the ultraviolet reactor 4. The filter 3 catches large organisms and the like which are hard to be killed through the ultraviolet treatment by the ultraviolet reactor 4. Microbes and the like in the treatment target water are subsequently killed through the ultraviolet treatment by the ultraviolet reactor 4. Treated water obtained by killing microbes and the like therein is then fed into the ballast tank 5 as ballast water. Discharging outboard treatment target water can be stopped when the timer checks elapse of the predetermined period from the start of drawing treatment target water, or at elapse of a predetermined period.

Figure 2:
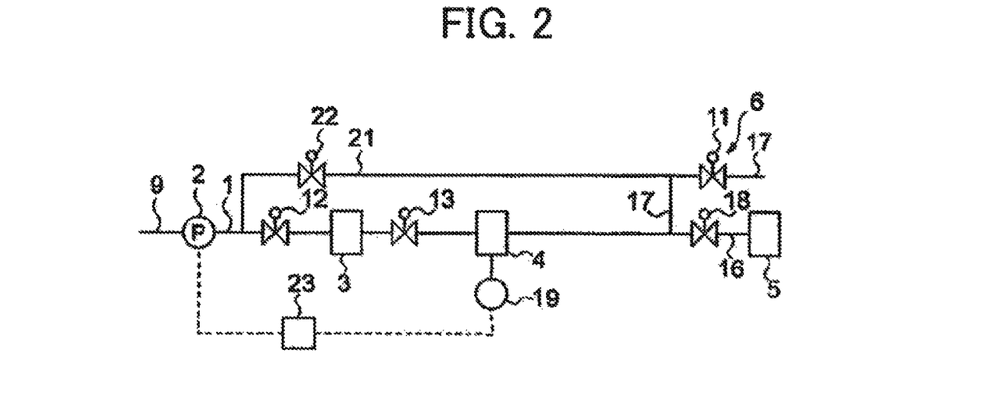
FIG. 2 is a schematic configuration diagram of a ballast water treatment device according to a second or third exemplary embodiment of the present invention.

A ballast water treatment device according to a second exemplary embodiment of the present invention is described next with reference to the schematic configuration diagram in FIG. 2.

Configurations in the ballast water treatment device according to the present exemplary embodiment identical with those in the first exemplary embodiment are denoted by the identical reference signs. The description same as that in the first exemplary embodiment is not provided repeatedly in the present exemplary embodiment where appropriate.

Similarly to the first exemplary embodiment, the ballast water treatment device according to the present exemplary embodiment includes, on the ballast water treatment line 1, the pump 2 for drawing and pressure feeding treatment target water, the filter 3, the ultraviolet reactor 4 for irradiating the drawn treatment target water with ultraviolet, and the ballast tank 5 for storing treated water having been treated with ultraviolet.

The ballast water treatment line 1 according to the present exemplary embodiment is divided, at a downstream portion of the ultraviolet reactor 4, into a ballast water pouring line 16 and an outboard discharge line 17. The ballast water pouring line 16 is provided with a ballast water pouring valve 18, and the outboard discharge line 17 is provided with the outboard discharge valve 11 serving as the outboard discharger 6.

The ballast water treatment line 1 is provided with a bypass line 21 that has a first end connected to an upstream portion of the filter 3 and a second end bypassing the filter and the ultraviolet reactor 4 and connected to the outboard discharge line 17. The bypass line 21 is provided with a bypass valve 22.

The ballast water treatment line 1 is also provided with the treated water valve 12 and a filter exit valve 13. The treated water valve 12 is located between the filter 3 and the first end of the bypass line 21 connected to the upstream portion of the filter 3. The filter exit valve 13 is located between the filter 3 and the ultraviolet reactor 4.

The ultraviolet reactor 4 is provided therein with an ultraviolet irradiation sensor 19 for detecting ultraviolet illuminance of an ultraviolet lamp (not shown).

The ballast water treatment device according to the present exemplary embodiment further includes a controller 23 having a control function of controlling to open or close the outboard discharge valve 11 serving as the outboard discharger 6, the treated water valve 12, the filter exit valve 13, the ballast water pouring valve 18, and the bypass valve 22, as well as a control function of flowing treatment target water along the bypass line 21 for a predetermined period from the start of drawing treatment target water to discharge outboard by the outboard discharger 6 without passing through the filter 3 and the ultraviolet reactor 4, closing the bypass line 21 at elapse of the predetermined period to pass treatment target water through the filter 3 and the ultraviolet reactor 4 and start treating with ultraviolet treatment target water passing through the ultraviolet reactor 4 and regulating the ultraviolet illuminance, and stopping discharging outboard by the outboard discharger 6 when the ultraviolet illuminance detected by the ultraviolet irradiation sensor 19 reaches a predetermined level to pour treated water having been treated with ultraviolet into the ballast tank 5.

The predetermined period from the start of drawing treatment target water is set similarly to that of the first exemplary embodiment, and the controller 23 includes a timer (not shown) that checks a period elapsed from the start of drawing treatment target water. The predetermined illuminance of the ultraviolet lamp is set to a level of an irradiation amount sufficient for killing microbes and the like in treatment target water.

The controller 23 according to the present exemplary embodiment can optionally have a delay control function of not stopping discharging outboard by the outboard discharger 6 immediately after the ultraviolet illuminance detected by the ultraviolet irradiation sensor 19 reaches the predetermined level, but continuing discharging outboard treatment target water and stopping discharging outboard at a time point delayed by a predetermined period from a time point when the ultraviolet illuminance reaches the predetermined level to pour treated water having been treated with ultraviolet into the ballast tank 5.

A delayed period by the predetermined period from the time point when the ultraviolet illuminance reaches the predetermined level is set when the ultraviolet illuminance reaches the predetermined level, as a period until treatment target water located downstream of the ultraviolet reactor 4 and treated by insufficiently killing microbes is discharged outboard.

The ballast water treatment device thus configured according to the present exemplary embodiment treats treatment target water in the following manner.

Initially, the treated water valve 12, filter exit valve 13, and the ballast water pouring valve 18 are closed, the bypass valve 22 and the outboard discharge valve 11 are opened, and the pump 2 is started. When the pump 2 is started, treatment target water flows to the bypass line 21 and the outboard discharge line 17 and is discharged outboard by the outboard discharger 6 without passing though the filter 3 and the ultraviolet reactor 4.

When treatment target water starts being drawn, the timer provided to the controller 23 starts counting. When the timer checks elapse of the predetermined period from the start of drawing treatment target water, the bypass valve 22 is closed and the treated water valve 12 and the filter exit valve 13 are then opened to continue discharging outboard treatment target water. While treatment target water is continuously discharged outboard, treatment target water is caused to pass through the filter 3 and the ultraviolet reactor 4 so that treatment target water passing through the ultraviolet reactor 4 starts being treated with ultraviolet, the ultraviolet illuminance is regulated, the outboard discharge valve 11 is closed to stop discharging outboard when the ultraviolet illuminance detected by the ultraviolet irradiation sensor 19 reaches the predetermined level, and the ballast water pouring valve 18 is opened.

In this manner, the filter 3 catches large organisms and the like which are hard to be killed through the ultraviolet treatment by the ultraviolet reactor 4. Microbes and the like in the treatment target water are subsequently killed through the ultraviolet treatment by the ultraviolet reactor 4. Treated water obtained by killing microbes and the like therein is then fed into the ballast tank 5 as ballast water.

The controller 23 having the delay control function does not stop discharging outboard by the outboard discharger 6 immediately after the ultraviolet illuminance detected by the ultraviolet irradiation sensor 19 reaches the predetermined level, but continues discharging outboard treatment target water and stops discharging outboard at the time point delayed by the predetermined period from the time point when the ultraviolet illuminance reaches the predetermined level to pour treated water having been treated with ultraviolet into the ballast tank 5.

A ballast water treatment device according to a third exemplary embodiment of the present invention is described next.

The ballast water treatment device according to the present exemplary embodiment is different from that of the second exemplary embodiment in the control function of the controller 23 and other configurations are identical therewith. Similarly to the second exemplary embodiment, the ballast water treatment device according to the present exemplary embodiment is described with reference to the schematic configuration diagram in FIG. 2.

The controller 23 in the ballast water treatment device according to the present exemplary embodiment has a control function of flowing treatment target water along the bypass line 21 for a predetermined period from the start of drawing treatment target water to discharge outboard by the outboard discharger 6 without passing through the filter 3 and the ultraviolet reactor 4, passing treatment target water through the filter 3 and the ultraviolet reactor 4 at elapse of the predetermined period and then closing the bypass line 21 to start treating with ultraviolet treatment target water passing through the ultraviolet reactor 4 and regulating ultraviolet illuminance, and stopping discharging outboard by the outboard discharger 6 when the ultraviolet illuminance detected by the ultraviolet irradiation sensor 19 reaches a predetermined level to pour treated water having been treated with ultraviolet into the ballast tank 5.

The ballast water treatment device thus configured according to the present exemplary embodiment treats treatment target water in the following manner.

Initially, the treated water valve 12, filter exit valve 13, and the ballast water pouring valve 18 are closed, the bypass valve 22 and the outboard discharge valve 11 are opened, and the pump 2 is started. When the pump 2 is started, treatment target water flows to the bypass line 21 and the outboard discharge line 17 and is discharged outboard by the outboard discharger 6 without passing though the filter 3 and the ultraviolet reactor 4.

When treatment target water starts being drawn, the timer provided to the controller 23 starts counting. When the timer checks elapse of the predetermined period from the start of drawing treatment target water, the treated water valve 12 and the filter exit valve 13 are opened to continue discharging outboard treatment target water. While treatment target water is continuously discharged outboard, treatment target water is caused to pass through the filter 3 and the ultraviolet reactor 4, the bypass valve 22 is then closed so that treatment target water passing through the ultraviolet reactor 4 starts being treated with ultraviolet and the ultraviolet illuminance is regulated, the outboard discharge valve 11 is closed to stop discharging outboard when the ultraviolet illuminance detected by the ultraviolet irradiation sensor 19 reaches the predetermined level, and the ballast water pouring valve 18 is opened.

In this manner, similarly to the second exemplary embodiment, the filter 3 catches large organisms and the like which are hard to be killed through the ultraviolet treatment by the ultraviolet reactor 4. Microbes and the like in the treatment target water are subsequently killed through the ultraviolet treatment by the ultraviolet reactor 4. Treated water obtained by killing microbes and the like therein is then fed into the ballast tank 5 as ballast water.

Similarly to the second exemplary embodiment, the controller 23 having the delay control function does not stop discharging outboard by the outboard discharger 6 immediately after the ultraviolet illuminance detected by the ultraviolet irradiation sensor 19 reaches the predetermined level, but continues discharging outboard treatment target water and stops discharging outboard at the time point delayed by the predetermined period from the time point when the ultraviolet illuminance reaches the predetermined level to pour treated water having been treated with ultraviolet into the ballast tank 5.

Figure 3:
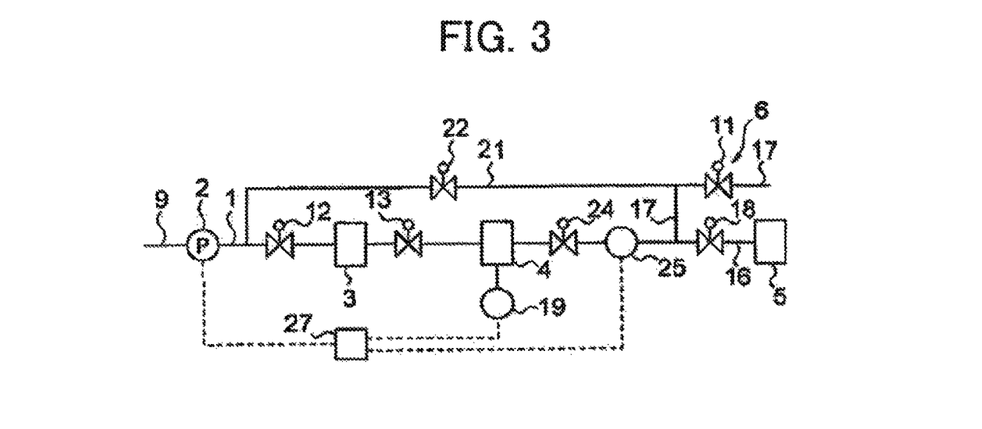
FIG. 3 is a schematic configuration diagram of a ballast water treatment device according to a fourth or fifth exemplary embodiment of the present invention.

A ballast water treatment device according to a fourth exemplary embodiment of the present invention is described next with reference to the schematic configuration diagram in FIG. 3.

Configurations in the ballast water treatment device according to the present exemplary embodiment identical with those in the second exemplary embodiment are denoted by the identical reference signs. The description same as that in the first and second exemplary embodiments is not provided repeatedly in the present exemplary embodiment where appropriate.

Similarly to the second exemplary embodiment, the ballast water treatment device according to the present exemplary embodiment includes, on the ballast water treatment line 1, the pump 2 for drawing and pressure feeding treatment target water, the filter 3, the ultraviolet reactor 4 for irradiating the drawn treatment target water with ultraviolet, and the ballast tank 5 for storing treated water having been treated with ultraviolet.

The ballast water treatment line 1 according to the present exemplary embodiment is divided, at a downstream portion of the ultraviolet reactor 4, into a ballast water pouring line 16 and an outboard discharge line 17. The ballast water pouring line 16 is provided with a ballast water pouring valve 18, and the outboard discharge line 17 is provided with the outboard discharge valve 11 serving as the outboard discharger 6.

The ballast water treatment line 1 is provided with a bypass line 21 that has a first end connected to an upstream portion of the filter 3 and a second end bypassing the filter 3 and the ultraviolet reactor 4 and connected to the outboard discharge line 17. The bypass line 21 is provided with a bypass valve 22.

The ballast water treatment line 1 is also provided with the treated water valve 12 and a filter exit valve 13. The treated water valve 12 is located between the filter 3 and the first end of the bypass line 21 connected to the upstream portion of the filter 3. The filter exit valve 13 is located between the filter 3 and the ultraviolet reactor 4.

The ultraviolet reactor 4 is provided therein with the ultraviolet irradiation sensor 19 for detecting illuminance of an ultraviolet lamp (not shown).

The ballast water treatment line 1 is provided, at a downstream portion of the ultraviolet reactor 4, with a flow regulating value 24 for regulating a flow rate of treatment target water and a flowmeter 25 for detecting the flow rate.

The ballast water treatment device according to the present exemplary embodiment further includes a controller 27 having a control function of controlling to open or close the outboard discharge valve 11 serving as the outboard discharger 6, the treated water valve 12, the filter exit valve 13, the ballast water pouring valve 18, and the bypass valve 22, as well as a control function of flowing treatment target water along the bypass line 21 for a predetermined period from the start of drawing treatment target water to discharge outboard by the outboard discharger 6 without passing through the filter 3 and the ultraviolet reactor 4, closing the bypass line 21 at elapse of the predetermined period to pass treatment target water through the filter 3 and the ultraviolet reactor 4, starting treating with ultraviolet treatment target water passing through the ultraviolet reactor 4 when a flow rate detected by the flowmeter 25 reaches a predetermined level and regulating the ultraviolet illuminance, and stopping discharging outboard by the outboard discharger 6 when the ultraviolet illuminance detected by the ultraviolet irradiation sensor 19 reaches a predetermined level to pour treated water having been treated with ultraviolet into the ballast tank 5.

The predetermined period from the start of drawing treatment target water is set similarly to that of the first exemplary embodiment, and the controller 27 includes a timer (not shown) that checks a period elapsed from the start of drawing treatment target water. The predetermined illuminance of the ultraviolet lamp is set to a level similar to that of the second exemplary embodiment.

The predetermined flow rate of treatment target water is set such that microbes and the like in the treatment target water can be killed by ultraviolet irradiation according to the correlation between the ultraviolet illuminance to treatment target water and a period of ultraviolet irradiation.

The controller 27 according to the present exemplary embodiment can optionally have the delay control function similarly to the second exemplary embodiment.

The ballast water treatment device thus configured according to the present exemplary embodiment treats treatment target water in the following manner.

Initially, the treated water valve 12, filter exit valve 13, and the ballast water pouring valve 18 are closed, the bypass valve 22 and the outboard discharge valve 11 are opened, and the pump 2 is started. When the pump 2 is started, treatment target water flows to the bypass line 21 and the outboard discharge line 17 and is discharged outboard by the outboard discharger 6 without passing though the filter 3 and the ultraviolet reactor 4.

When treatment target water starts being drawn, the timer provided to the controller 27 starts counting. When the timer checks elapse of the predetermined period from the start of drawing treatment target water, the bypass valve 22 is closed and the treated water valve 12 and the filter exit valve 13 are then opened to continue discharging outboard treatment target water. While treatment target water is continuously discharged outboard, treatment target water is caused to pass through the filter 3 and the ultraviolet reactor 4. The flow rate of treatment target water flowing along the ballast water treatment line 1 is regulated by the flow regulating value 24 while the flow rate is detected by the flowmeter 25. When the flowmeter 25 detects that the flow rate reaches the predetermined level, the ultraviolet lamp in the ultraviolet reactor 4 is lit and the ultraviolet illuminance is regulated. The outboard discharge valve 11 is closed to stop discharging outboard when the ultraviolet illuminance detected by the ultraviolet irradiation sensor 19 reaches the predetermined level, and the ballast water pouring valve 18 is opened.

In this manner, the filter 3 catches large organisms and the like which are hard to be killed through the ultraviolet treatment by the ultraviolet reactor 4. The subsequent ultraviolet treatment by the ultraviolet reactor 4 enables irradiation of treatment target water with a predetermined amount of ultraviolet to kill microbes and the like in the treatment target water. Treated water obtained by killing microbes and the like therein is then fed into the ballast tank 5 as ballast water.

The ballast water treatment device according to the present exemplary embodiment further includes the flowmeter 25 that is located downstream of the ultraviolet reactor 4 and detects a flow rate. Treatment target water passing through the ultraviolet reactor 4 starts being treated with ultraviolet when the flow rate detected by the flowmeter 25 reaches the predetermined level. The ultraviolet treatment can be performed more effectively and efficiently, and treated water poured into the ballast tank 5 can be treated by more reliably killing microbes therein.

The controller 27 having the delay control function does not stop discharging outboard by the outboard discharger 6 immediately after the ultraviolet illuminance detected by the ultraviolet irradiation sensor 19 reaches the predetermined level, but continues discharging outboard treatment target water and stops discharging outboard at the time point delayed by the predetermined period from the time point when the ultraviolet illuminance reaches the predetermined level to pour treated water having been treated with ultraviolet into the ballast tank 5.

A ballast water treatment device according to a fifth exemplary embodiment of the present invention is described next.

The ballast water treatment device according to the present exemplary embodiment is different from that of the fourth exemplary embodiment in the control function of the controller 27 and other configurations are identical therewith. Similarly to the fourth exemplary embodiment, the ballast water treatment device according to the present exemplary embodiment is described with reference to the schematic configuration diagram in FIG. 3.

The controller 27 in the ballast water treatment device according to the present exemplary embodiment has a control function of flowing treatment target water along the bypass line 21 for a predetermined period from the start of drawing treatment target water to discharge outboard by the outboard discharger 6 without passing through the filter 3 and the ultraviolet reactor 4, passing treatment target water through the filter 3 and the ultraviolet reactor 4 at elapse of the predetermined period and then closing the bypass line 21, starting treating with ultraviolet treatment target water passing through the ultraviolet reactor 4 when a flow rate detected by the flowmeter 25 reaches a predetermined level and regulating ultraviolet illuminance, and stopping discharging outboard by the outboard discharger 6 when the ultraviolet illuminance detected by the ultraviolet irradiation sensor 19 reaches a predetermined level to pour treated water having been treated with ultraviolet into the ballast tank 5.

The ballast water treatment device thus configured according to the present exemplary embodiment treats treatment target water in the following manner.

Initially, the treated water valve 12, filter exit valve 13, and the ballast water pouring valve 18 are closed, the bypass valve 22 and the outboard discharge valve 11 are opened, and the pump 2 is started. When the pump 2 is started, treatment target water flows to the bypass line 21 and the outboard discharge line 17 and is discharged outboard by the outboard discharger 6 without passing though the filter 3 and the ultraviolet reactor 4.

When treatment target water starts being drawn, the timer provided to the controller 27 starts counting. When the timer checks elapse of the predetermined period from the start of drawing treatment target water, the treated water valve 12 and the filter exit valve 13 are opened to continue discharging outboard treatment target water. While treatment target water is continuously discharged outboard, treatment target water is caused to pass through the filter 3 and the ultraviolet reactor 4. The bypass valve 22 is then closed, and the flow rate of treatment target water flowing along the ballast water treatment line 1 is regulated by the flow regulating value 24 while the flow rate is detected by the flowmeter 25. When the flowmeter 25 detects that the flow rate reaches the predetermined level, the ultraviolet lamp in the ultraviolet reactor 4 is lit and the ultraviolet illuminance is regulated to reach the predetermined level. The outboard discharge valve 11 is closed to stop discharging outboard when the ultraviolet illuminance detected by the ultraviolet irradiation sensor 19 reaches the predetermined level, and the ballast water pouring valve 18 is opened.

In this manner, similarly to the fourth exemplary embodiment, the filter 3 catches large organisms and the like which are hard to be killed through the ultraviolet treatment by the ultraviolet reactor 4. The subsequent ultraviolet treatment by the ultraviolet reactor 4 enables irradiation of treatment target water with a predetermined amount of ultraviolet to kill microbes and the like in the treatment target water. Treated water obtained by killing microbes and the like therein is then fed into the ballast tank 5 as ballast water.

The ballast water treatment device according to the present exemplary embodiment further includes the flowmeter 25 that is located downstream of the ultraviolet reactor 4 and detects a flow rate. Treatment target water passing through the ultraviolet reactor 4 starts being treated with ultraviolet when the flow rate detected by the flowmeter 25 reaches the predetermined level. The ultraviolet treatment can be performed more effectively and efficiently, and treated water poured into the ballast tank 5 can be treated by more reliably killing microbes therein.

The controller 27 having the delay control function does not stop discharging outboard by the outboard discharger 6 immediately after the ultraviolet illuminance detected by the ultraviolet irradiation sensor 19 reaches the predetermined level, but continues discharging outboard treatment target water and stops discharging outboard at the time point delayed by the predetermined period from the time point when the ultraviolet illuminance reaches the predetermined level to pour treated water having been treated with ultraviolet into the ballast tank 5.

Figure 4:
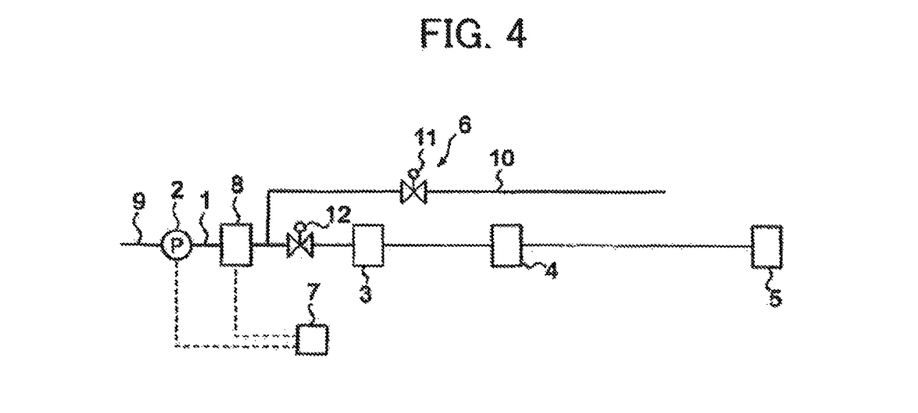
FIG. 4 is a schematic configuration diagram of a ballast water treatment device according to a sixth exemplary embodiment of the present invention.

Next, a sixth exemplary embodiment of the ballast water treatment device according to the present invention will be described with reference to the schematic configuration diagram of FIG. 4.

Configurations in the ballast water treatment device according to the present exemplary embodiment that are identical with those of the first exemplary embodiment are denoted by the same reference signs. Redundant description of the same configurations as those in the first exemplary embodiment is omitted where appropriate.

In the present exemplary embodiment and the subsequent seventh to tenth exemplary embodiments, the ballast water treatment device will be described as being a ballast water treatment device which is attached to a vessel equipped with the line 1 through which the treatment target water that has been drawn flows, and with the ballast tank 5 connected downstream of the line 1, and which treats the drawn treatment target water. That is, the ballast water treatment device may refer to the concept including: equipment installed on the vessel, such as the line 1, the pump 2, and the ballast tank 5; treatment devices attached to the equipment to treat the ballast water (treatment target water), such as the filter 3 and the ultraviolet reactor 4; and a controller for controlling the treatment devices. The ballast water treatment device may also refer to the concept excluding the equipment installed on the vessel and instead consisting of configurations for treating the ballast water (treatment target water), such as the filter 3, the ultraviolet reactor 4, and the controller. Hereinafter, the line 1 attached to the vessel will be described as a ballast water treatment line 1.

The ballast water treatment device according to the present exemplary embodiment is additionally provided with a turbidity meter 8. That is, in the present exemplary embodiment, the ballast water treatment device includes the filter 3, the ultraviolet reactor 4, the turbidity meter 8, and the controller 7, and is installed in a vessel equipped with, e.g., the ballast water treatment line 1, the pump 2, the outboard discharge valve 11, and the ballast tank 5. The locations of the ballast water treatment line 1, the pump 2, the filter 3, the ultraviolet reactor 4, the treatment target water drawing line 9, the line 10, the outboard discharge valve 11, and the treated water valve 12 are the same as those of the first exemplary embodiment. The turbidity meter 8 is disposed downstream of the pump 2 and upstream of the line 10 in the ballast water treatment line 1. The turbidity meter 8 measures the turbidity of the treatment target water drawn by the pump 2.

In the present exemplary embodiment, the controller 7, in the early stage of drawing of the treatment target water, causes the treatment target water to be discharged outboard from the upstream side of the filter 3 until water quality is stabilized. When the water quality of treatment target water has become stabilized, the controller 7 causes the filter 3 to perform filtering, and causes the treated water filtered by the filter 3 to be poured into the ballast tank 5.

More specifically, the controller 7 monitors the turbidity of the treatment target water measured by the turbidity meter 8. The controller 7 determines that the water quality has stabilized when the turbidity of the treatment target water has reached a predetermined turbidity (has been decreased to a predetermined turbidity or below) in the early stage of drawing of the treatment target water. The predetermined turbidity may be, for example, stored in the controller 7 as a set value and also be capable of being input according to the water quality of the area where the ballast water treatment device is used.

The ballast water treatment device thus configured according to the present exemplary embodiment treats the treatment target water as follows.

First, the treated water valve 12 is closed, the outboard discharge valve 11 is opened, and the pump 2 is started. As the pump 2 is started, the treatment target water flows into the line 10, and is discharged outboard by the outboard discharger 6 without passing through the filter 3 and the ultraviolet reactor 4. The controller 7 monitors the turbidity of the treatment target water being measured by the turbidity meter 8.

As the drawing of the treatment target water is started, the water around the vessel is shaken in the early stage of drawing. As a result, the sand and mud on the bottom of the sea are caused to rise, and the turbidity measured by the turbidity meter 8 increases. When it is confirmed that the turbidity that has been measured by the turbidity meter 8 reaches a predetermined turbidity, that is to say, the turbidity is decreased to a predetermined turbidity or below, the controller 7 opens the treated water valve 12 and closes the outboard discharge valve 11 so as to stop the discharge of the treatment target water outboard. The treatment target water therefore passes through the filter 3 and the ultraviolet reactor 4. In the filter 3, large organisms and the like that are not effectively killed by the ultraviolet treatment in the ultraviolet reactor 4 are caught. Thereafter, the microbes and the like in the treatment target water are killed by the ultraviolet treatment in the ultraviolet reactor 4. Treated water obtained by killing the microbes and the like is fed into the ballast tank 5 as ballast water.

A seventh exemplary embodiment of the ballast water treatment device according to the present invention will be described with reference to the schematic configuration diagram of FIG. 5. In the present exemplary embodiment, the configuration of lines and the locations of pumps, filters and the like are the same as in the second exemplary embodiment illustrated in FIG. 2, with the exception that the ballast water treatment device is additionally provided with the turbidity meter 8. That is, in the present exemplary embodiment, the ballast water treatment line 1 diverges to a line 16 for pouring the ballast water into the ballast tank 5 downstream of the ultraviolet reactor 4, and to a line 17 for outboard discharge. The line 16 is fitted with the ballast water pouring valve 18. The line 17 is fitted with the outboard discharge valve 11 constituting the outboard discharger 6.

In the ballast water treatment line 1, the bypass line 21 is provided of which one end is connected to the upstream side of the filter 3, the other end being connected to the line 17 while bypassing the filter 3 and the ultraviolet reactor 4. The bypass line 21 is fitted with the bypass valve 22.

In addition, in the ballast water treatment line 1, the treated water valve 12 is provided between one end of the bypass line 21 connected to the upstream side of the filter 3 and the filter 3. Between the filter 3 and the ultraviolet reactor 4, the filter exit valve 13 is fitted.

In the ultraviolet reactor 4, the ultraviolet irradiation sensor 19 for detecting the ultraviolet illuminance of the ultraviolet lamp (not illustrated) is provided. The turbidity meter 8 is disposed on the downstream side of the pump 2 in the ballast water treatment line 1, and on the upstream side of the bypass line 21.

Further, in the present exemplary embodiment, the controller 23 has a control function for controlling the opening and closing of the outboard discharge valve 11 constituting the outboard discharger 6, the treated water valve 12, the filter exit valve 13, the ballast water pouring valve 18, and the bypass valve 22. The controller 23 also has a control function whereby the treatment target water is caused to pass through the bypass line 21 and be discharged outboard until the water quality becomes stable after the start of drawing of the treatment target water; the bypass line 21 is closed when the water quality has stabilized; after the bypass line 21 is closed, the treatment target water is passed through the filter 3 and the ultraviolet reactor 4 and then discharged outboard; ultraviolet treatment of the treatment target water passing through the ultraviolet reactor 4 is started and the ultraviolet reactor 4 is controlled to regulate the ultraviolet illuminance; and when the illuminance detected by the ultraviolet irradiation sensor 19 has reached a predetermined illuminance, the outboard discharge of the treatment target water that has passed through the ultraviolet reactor 4 is stopped, and the treatment target water is poured into the ballast tank 5.

The determination of the water quality by the controller 23 is performed by monitoring the turbidity of the treatment target water measured by the turbidity meter 8. Specifically, the controller 23 determines that the water quality has stabilized when the turbidity of the treatment target water has reached a predetermined turbidity (has been decreased to a predetermined turbidity or below) in the early stage of drawing of the treatment target water. The predetermined illuminance of the ultraviolet lamp is set as an ultraviolet illuminance with which a sufficient amount of irradiation for killing the microbes and the like in the treatment target water can be obtained.

The controller 23 of the present exemplary embodiment may be provided with a delay control function whereby the outboard discharge by the outboard discharger 6 is not immediately stopped even when the ultraviolet illuminance detected by the ultraviolet irradiation sensor 19 has reached the predetermined illuminance, so that the outboard discharge of the treatment target water is continued; the outboard discharge is stopped with a predetermined time of delay after the ultraviolet illuminance has reached the predetermined illuminance; and the treated water obtained by ultraviolet treatment is poured into the ballast tank 5.

The delay time by which a predetermined time of delay is introduced from the point in time when the ultraviolet illuminance has reached the predetermined illuminance is set as a time that elapses before the treatment target water that still remains insufficiently treated for killing the microbes and the like therein on the downstream side of the ultraviolet reactor 4 when the ultraviolet illuminance has reached the predetermined illuminance is discharged outboard.

The thus configured ballast water treatment device according to the present exemplary embodiment treats the treatment target water as follows.

First, the treated water valve 12, the filter exit valve 13, and the ballast water pouring valve 18 are closed, the bypass valve 22 and the outboard discharge valve 11 are opened, and the pump 2 is started. As the pump 2 is started, the treatment target water flows into the bypass line 21 and the line 17, and is discharged outboard without passing through the filter 3 and the ultraviolet reactor 4. The controller 23 monitors the turbidity of the treatment target water measured by the turbidity meter 8.

As the drawing of the treatment target water is started, in the early stage of drawing, the water around the vessel is shaken, and the sand and mud on the bottom of the sea are caused to rise, whereby the turbidity measured by the turbidity meter 8 increases. The controller 23, upon confirming that the turbidity that has been measured by the turbidity meter 8 reaches a predetermined turbidity, that is to say, the turbidity is decreased to a predetermined turbidity or below, closes the bypass valve 22 to stop the outboard discharge of the treatment target water via the bypass line 21. The controller 23 then opens the treated water valve 12 and the filter exit valve 13 so as to discharge outboard the treatment target water that has passed through the filter 3 and the ultraviolet reactor 4. That is, while the outboard discharge of the treatment target water that has been passed through the filter 3 and the ultraviolet reactor 4 is continued, ultraviolet treatment of the treatment target water as it passes through the ultraviolet reactor 4 is started. At the same time, the ultraviolet illuminance is regulated, and when the ultraviolet illuminance detected by the ultraviolet irradiation sensor 19 has reached the predetermined illuminance, the outboard discharge valve 11 is closed, the outboard discharge is stopped, and the ballast water pouring valve 18 is opened.

In this way, large microbes and the like that are not effectively killed by the ultraviolet treatment in the ultraviolet reactor 4 are caught by the filter 3. Thereafter, microbes and the like in the treatment target water are killed by the ultraviolet treatment in the ultraviolet reactor 4, and the treated water obtained by killing the microbes and the like are fed into the ballast tank 5 as ballast water.

By providing the controller 23 with the above-described delay control function, instead of immediately stopping the outboard discharge when the ultraviolet illuminance detected by the ultraviolet irradiation sensor 19 has reached the predetermined illuminance, the outboard discharge of the treatment target water can be continued. The outboard discharge can be stopped after a predetermined time of delay since the point in time when the ultraviolet illuminance has reached the predetermined illuminance, and then the treated water obtained by ultraviolet treatment can be poured into the ballast tank 5.

An eighth exemplary embodiment of the ballast water treatment device according to the present invention will be described.

The ballast water treatment device according to the present exemplary embodiment differs from the seventh exemplary embodiment only in the control function of the controller 23, and is the same in other configurations. Accordingly, as in the seventh exemplary embodiment, the present exemplary embodiment will be described with reference to the schematic configuration diagram of FIG. 5.

In the ballast water treatment device according to the present exemplary embodiment, the controller 23 has the following control function. The treatment target water is passed through the bypass line 21 and discharged outboard until the water quality becomes stable after the start of drawing of the treatment target water. When the water quality has stabilized, the treatment target water, with the bypass line 21 kept open, is passed through the filter 3 and the ultraviolet reactor 4 and then discharge outboard. Then, the bypass line 21 is closed, and ultraviolet treatment of the treatment target water passing through the ultraviolet reactor 4 is started. At the same time, the ultraviolet reactor 4 is controlled to regulate the ultraviolet illuminance. When the illuminance detected by the ultraviolet irradiation sensor 19 has reached a predetermined illuminance, the outboard discharge of the treatment target water that has passed through the ultraviolet reactor 4 is stopped, and the treatment target water is poured into the ballast tank 5.

The thus configured ballast water treatment device according to the present exemplary embodiment treats the treatment target water as follows.

First, the treated water valve 12, the filter exit valve 13, and the ballast water pouring valve 18 are closed, the bypass valve 22 and the outboard discharge valve 11 are opened, and the pump 2 is started. As the pump 2 is started, the treatment target water flows into the bypass line 21 and the line 17, and is discharged outboard without passing through the filter 3 and the ultraviolet reactor 4. The controller 23 monitors the turbidity of the treatment target water measured by the turbidity meter 8.

As the drawing of the treatment target water is started, in the early stage of drawing, the water around the vessel is shaken and the sand and mud on the bottom of the sea are caused to rise, whereby the turbidity measured by the turbidity meter 8 increases. The controller 23, upon confirming that the turbidity that has been measured by the turbidity meter 8 reaches a predetermined turbidity, that is to say, the turbidity is decreased to a predetermined turbidity or below, continues the outboard discharge of the treatment target water by opening the treated water valve 12 and the filter exit valve 13 further with the bypass line 21 (bypass valve 22) kept open. While the outboard discharge of the treatment target water via the bypass line 21 is continued, the outboard discharge of the treatment target water that has passed through the filter 3 and the ultraviolet reactor 4 is also performed. Thereafter, the bypass valve 22 is closed and the outboard discharge via the bypass line 21 is stopped, and ultraviolet treatment of the treatment target water passing through the ultraviolet reactor 4 is started. At the same time, the ultraviolet illuminance is regulated and the outboard discharge of the treatment target water that has passed through the filter 3 and the ultraviolet reactor 4 is continued. When the ultraviolet illuminance detected by the ultraviolet irradiation sensor 19 has reached the predetermined illuminance, the outboard discharge valve 11 is closed and the outboard discharge is stopped, and the ballast water pouring valve 18 is opened.

In this way, as in the seventh exemplary embodiment, large microbes and the like that are not effectively killed by the ultraviolet treatment in the ultraviolet reactor 4 are caught by the filter 3. Thereafter, microbes and the like in the treatment target water are killed by the ultraviolet treatment in the ultraviolet reactor 4, and the treated water obtained by killing the microbes and the like is fed into the ballast tank 5 as ballast water.

As in the seventh exemplary embodiment, by providing the controller 23 with the above-described delay control function, instead of immediately stopping the outboard discharge by the outboard discharger 6 when the ultraviolet illuminance detected by the ultraviolet irradiation sensor 19 has reached the predetermined illuminance, the outboard discharge of the treatment target water can be continued. The outboard discharge can be stopped after a predetermined time of delay since the point in time when the ultraviolet illuminance has reached the predetermined illuminance, and then the treated water obtained by ultraviolet treatment can be poured into the ballast tank 5.

Figure 6:
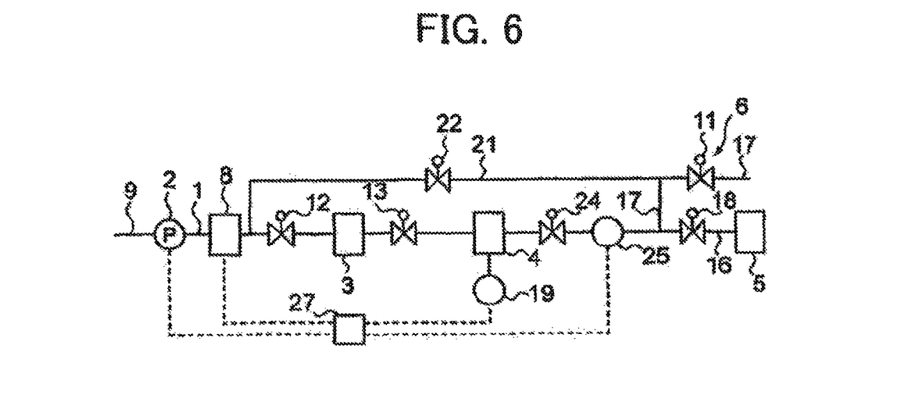
FIG. 6 is a schematic configuration diagram of a ballast water treatment device according to a ninth or tenth exemplary embodiment of the present invention.

A ninth exemplary embodiment of the ballast water treatment device according to the present invention will be described with reference to the schematic configuration diagram of FIG. 6.

Figure 5:
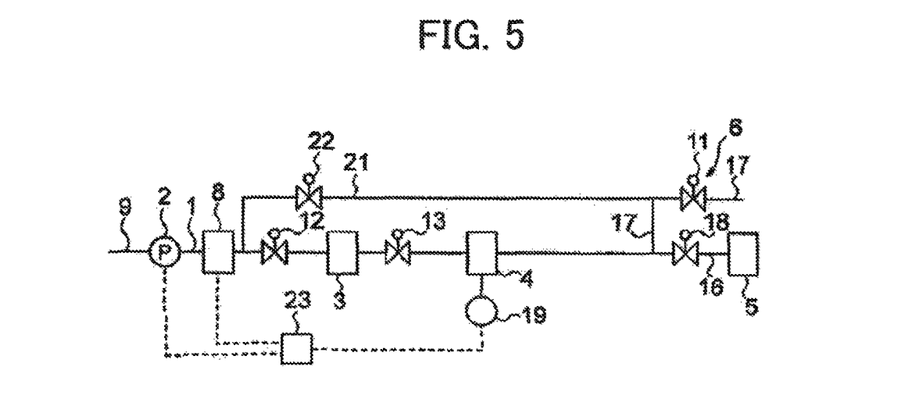
FIG. 5 is a schematic configuration diagram of a ballast water treatment device according to a seventh or eighth exemplary embodiment of the present invention.

The configuration of the present exemplary embodiment differs from the seventh exemplary embodiment illustrated in FIG. 5 in that the ballast water treatment line 1 on the downstream side of the ultraviolet reactor 4 is provided with the flow regulating valve 24 for regulating the flow rate of the treatment target water, and the flowmeter 25 for detecting the flow rate.

Further, in the present exemplary embodiment, the controller 27 has a control function for controlling the opening and closing of the outboard discharge valve 11 constituting the outboard discharger 6, the treated water valve 12, the filter exit valve 13, the ballast water pouring valve 18, and the bypass valve 22. The controller 27 also has a control function whereby the treatment target water is caused to pass through the bypass line 21 and be discharged outboard until the water quality becomes stable after the start of drawing of the treatment target water; the bypass line 21 is closed when the water quality has stabilized; after the bypass line 21 is closed, the treatment target water is passed through the filter 3 and the ultraviolet reactor 4 and then discharged outboard; when the flow rate detected by the flowmeter 25 has reached a predetermined flow rate, ultraviolet treatment of the treatment target water passing through the ultraviolet reactor 4 is started and the ultraviolet reactor 4 is controlled to regulate the ultraviolet illuminance; when the illuminance detected by the ultraviolet irradiation sensor 19 has reached a predetermined illuminance, the outboard discharge of the treatment target water that has passed through the ultraviolet reactor 4 is stopped, and the treatment target water is poured into the ballast tank 5.

The determination of the water quality by the controller 27 is performed using the same technique as in the seventh exemplary embodiment. The controller 27 of the present exemplary embodiment may be provided with the delay control function as in the seventh exemplary embodiment.

The thus configured ballast water treatment device according to the present exemplary embodiment treats the treatment target water as follows.

First, the treated water valve 12, the filter exit valve 13, and the ballast water pouring valve 18 are closed, the bypass valve 22 and the outboard discharge valve 11 are opened, and the pump 2 is started. As the pump 2 is started, the treatment target water flows into the bypass line 21 and the line 17, and is discharged outboard without passing through the filter 3 and the ultraviolet reactor 4. The controller 27 monitors the turbidity of the treatment target water measured by the turbidity meter 8.

As the drawing of the treatment target water is started, in the early stage of drawing, the water around the vessel is shaken and the sand and mud on the bottom of the sea are caused to rise, whereby the turbidity measured by the turbidity meter 8 increases. The controller 27, upon confirming that the turbidity that has been measured by the turbidity meter 8 reaches a predetermined turbidity, that is to say, the turbidity is decreased to a predetermined turbidity or below, closes the bypass valve 22 to stop the outboard discharge of the treatment target water via the bypass line 21. The controller 27 then opens the treated water valve 12 and the filter exit valve 13, and causes the outboard discharge of the treatment target water that has passed through the filter 3 and the ultraviolet reactor 4. While the outboard discharge of the treatment target water that has passed through the filter 3 and the ultraviolet reactor 4 is continued, the flow rate of the treatment target water passing through the ballast water treatment line 1 is detected by the flowmeter 25, and regulated by the flow regulating valve 24. When it is detected by the flowmeter 25 that the flow rate has reached the predetermined flow rate, the ultraviolet lamp in the ultraviolet reactor 4 is lit, the ultraviolet illuminance is regulated, and, when the ultraviolet illuminance detected by the ultraviolet irradiation sensor 19 has reached the predetermined illuminance, the outboard discharge valve 11 is closed to stop the outboard discharge, and the ballast water pouring valve 18 is opened.

In this way, large microbes and the like that are not effectively killed by the ultraviolet treatment in the ultraviolet reactor 4 are caught by the filter 3. Thereafter, the treatment target water can be subjected to a predetermined amount of ultraviolet irradiation through the ultraviolet treatment in the ultraviolet reactor 4, whereby the microbes and the like in the treatment target water are killed, and the treated water obtained by killing the microbes and the like is fed into the ballast tank 5 as ballast water.

The ballast water treatment device according to the present exemplary embodiment is further provided, on the downstream side of the ultraviolet reactor 4, with the flowmeter 25 that detects the flow rate. When the flow rate detected by the flowmeter 25 has reached the predetermined flow rate, ultraviolet treatment on the treatment target water passing through the ultraviolet reactor 4 is started. Accordingly, the effect of the ultraviolet treatment can be more efficiently obtained, and the treated water obtained by killing the microbes and the like can be more reliably poured into the ballast tank 5.

By providing the controller 27 with the above-described delay control function, instead of immediately stopping the outboard discharge when the ultraviolet illuminance detected by the ultraviolet irradiation sensor 19 has reached the predetermined illuminance, the outboard discharge of the treatment target water can be continued. The outboard discharge can be stopped after a predetermined time of delay since the point in time when the ultraviolet illuminance has reached the predetermined illuminance, and then the treated water obtained by ultraviolet treatment can be poured into the ballast tank 5.

A tenth exemplary embodiment of the ballast water treatment device according to the present invention will be described.

The ballast water treatment device according to the present exemplary embodiment differs from the ninth exemplary embodiment only in the control function of the controller 27 and is the same in other configurations. Accordingly, as in the ninth exemplary embodiment, the present exemplary embodiment will be described with reference to the schematic configuration diagram of FIG. 6.

In the ballast water treatment device according to the present exemplary embodiment, the controller 27 has the following control function. The treatment target water is passed through the bypass line 21 and discharged outboard until the water quality becomes stable after the start of drawing of the treatment target water. When the water quality has stabilized, the treatment target water, with the bypass line 21 kept open, is passed through the filter 3 and the ultraviolet reactor 4 and then discharged outboard. Then, the bypass line 21 is closed, and, when the flow rate detected by the flowmeter 25 has reached a predetermined flow rate, ultraviolet treatment of the treatment target water passing through the ultraviolet reactor 4 is started. At the same time, the ultraviolet reactor 4 is controlled to regulate the ultraviolet illuminance. When the illuminance detected by the ultraviolet irradiation sensor 19 has reached a predetermined illuminance, the outboard discharge of the treatment target water that has passed through the ultraviolet reactor 4 is stopped, and the treatment target water is poured into the ballast tank 5.

The thus configured ballast water treatment device according to the present exemplary embodiment treats the treatment target water as follows.

First, the treated water valve 12, the filter exit valve 13, and the ballast water pouring valve 18 are closed, the bypass valve 22 and the outboard discharge valve 11 are opened, and the pump 2 is started. As the pump 2 is started, the treatment target water flows into the bypass line 21 and the line 17, without passing through the filter 3 and the ultraviolet reactor 4, and is discharged outboard by the outboard discharger 6. The controller 27 monitors the turbidity of the treatment target water measured by the turbidity meter 8.

As the drawing of the treatment target water is started, in the early stage of drawing, the water around the vessel is shaken and the sand and mud on the bottom of the sea are caused to rise, whereby the turbidity measured by the turbidity meter 8 increases. The controller 27, upon confirming that the turbidity that has been measured by the turbidity meter 8 reaches a predetermined turbidity, that is to say, the turbidity is decreased to a predetermined turbidity or below, continues the outboard discharge of the treatment target water by opening the treated water valve 12 and the filter exit valve 13 further, with the bypass line 21 (bypass valve 22) kept open. While the outboard discharge of the treatment target water via the bypass line 21 is continued, the outboard discharge of the treatment target water that has passed through the filter 3 and the ultraviolet reactor 4 is also performed. Thereafter, the bypass valve 22 is closed to stop the outboard discharge via the bypass line 21. While the outboard discharge of the treatment target water that has passed through the filter 3 and the ultraviolet reactor 4 is continued, the flow rate of the treatment target water passing through the ballast water treatment line 1 is detected by the flowmeter 25 and regulated by the flow regulating valve 24. When it is detected by the flowmeter 25 that the flow rate has reached the predetermined flow rate, the ultraviolet lamp in the ultraviolet reactor 4 is lit and the ultraviolet illuminance is regulated to become the predetermined illuminance. When the ultraviolet illuminance detected by the ultraviolet irradiation sensor 19 has reached the predetermined illuminance, the outboard discharge valve 11 is closed to stop the outboard discharge, and the ballast water pouring valve 18 is opened.

In this way, as in the ninth exemplary embodiment, large microbes and the like that are not effectively killed by the ultraviolet treatment in the ultraviolet reactor 4 are caught by the filter 3. Thereafter, the treatment target water is subjected to a predetermined amount of ultraviolet irradiation through the ultraviolet treatment in the ultraviolet reactor 4, whereby the microbes and the like in the treatment target water are killed, and the treated water obtained by killing the microbes and the like is fed into the ballast tank 5 as ballast water.

The ballast water treatment device according to the present exemplary embodiment is further provided, on the downstream side of the ultraviolet reactor 4, with the flowmeter 25 that detects the flow rate. When the flow rate detected by the flowmeter 25 has reached the predetermined flow rate, ultraviolet treatment on the treatment target water passing through the ultraviolet reactor 4 is started. Accordingly, the effect of the ultraviolet treatment can be more efficiently obtained, and the treated water obtained by killing the microbes and the like more reliably can be poured into the ballast tank 5.

By providing the controller 27 with the above-described delay control function, instead of immediately stopping the outboard discharge by the outboard discharger 6 when the ultraviolet illuminance detected by the ultraviolet irradiation sensor 19 has reached the predetermined illuminance, the outboard discharge of the treatment target water can be continued. The outboard discharge can be stopped after a predetermined time of delay since the point in time when the ultraviolet illuminance has reached the predetermined illuminance, and then the treated water obtained by ultraviolet treatment can be poured into the ballast tank 5.

The present invention can be embodied in other various forms without departing from the spirit or the leading features thereof. The above embodiments or examples are thus merely illustration on any points and should not be interpreted limitedly. The scope of the present invention is recited by the claims and is never restricted by the description. Any modification or alteration belonging to the equivalent range of the claims is made within the scope of the present invention.

For example, while in the sixth to the tenth exemplary embodiments, the controllers 7, 23, and 27 determine the stability of the water quality of treatment target water in the early stage of drawing based on the turbidity measured by the turbidity meter 8, this is not a limitation. For example, instead of the turbidity meter in the sixth to the tenth exemplary embodiments, a particle size analyzer may be provided to measure the particle size distribution of a suspension in the treatment target water, and the water quality of the treatment target water may be determined based on the particle size distribution measured by the particle size analyzer.

The water quality of treatment target water may also be determined based on the weight of a separated matter obtained by bypassing some of the treatment target water drawn up by the pump and the performing filtering and centrifugal separation.

Some of the treatment target water drawn up by the pump may be subjected to electric conductivity or electrostatic capacitance measurement, and the water quality of the treatment target water may be determined based on the electric conductivity or electrostatic capacitance measured.

When the stability of the water quality of treatment target water in the early stage of drawing is determined based on the turbidity measured by the turbidity meter 8, the controller may determine the stability of the water quality when the turbidity that has been temporarily increased in the early stage of drawing of the treatment target water is decreased to a level around the turbidity before the start of drawing.

REFERENCE SIGN LIST

1 Ballast water treatment line (Line)
2 Pump
3 Filter
4 Ultraviolet reactor
5 Ballast tank
6 Outboard discharger
7, 23, 27 Controller
8 Turbidity meter
10, 17 Outboard discharge line
19 Ultraviolet irradiation sensor
21 Bypass line
25 Flowmeter

The invention claimed is:

1. A ballast water treatment device configured to provide attached to a vessel with treated water, the vessel including a ballast water treatment line through which drawn treatment target water flows, a ballast tank and an outboard discharge line which are connected to a downstream side of the ballast water treatment line,
   the ballast water treatment device comprising:
   a filter disposed in the ballast water treatment line to filter the treatment target water;
   a bypass line configured to bypass the filter;
   a controller;
   a water quality measurement device connected to the ballast water treatment line;
   a treated water valve connected to the ballast water treatment line; and
   a bypass valve connected to the bypass line, wherein
   the controller causes the treated water valve to close and the bypass valve to open, such that the treatment target water is discharged outboard via the outboard discharge line from an upstream side of the filter, from a start of drawing of the treatment target water until a signal from the water quality measurement device reaches a predetermined value, and causes the bypass valve to close and the treated water valve to open.

2. The ballast water treatment device according to claim 1, wherein the water quality measurement device comprises a turbidity meter for measuring a turbidity of the drawn treatment target water, and
   wherein the controller monitors the turbidity of the treatment target water measured by the turbidity meter, and determines that the signal reaches the predetermined value when the turbidity of the treatment target water has reached a predetermined turbidity.

3. The ballast water treatment device according to claim 1, wherein the controller comprises a timer and
   the controller determines that the signal reaches the predetermined value when a predetermined time counted by the timer has elapsed since the start of drawing of the treatment target water.

4. The ballast water treatment device according to claim 1, further comprising:
   an ultraviolet reactor for performing ultraviolet irradiation on the treatment target water filtered by the filter; and
   an ultraviolet irradiation sensor for detecting an ultraviolet illuminance in the ultraviolet reactor;
   wherein the vessel further includes an outboard discharge valve connected to the outboard discharge line, and a ballast water pouring valve which is located downstream of the ultraviolet reactor,
   wherein the bypass line is configured to discharge the treatment target water outboard while bypassing the filter and the ultraviolet reactor, and the outboard discharge line is configured to discharge outboard the treatment target water from a downstream side of the ultraviolet reactor; and
   wherein the controller
   causes the outboard discharge valve to open to discharge outboard via the outboard discharge line the treatment target water which has passed through the filter and the ultraviolet reactor, after the controller causes the bypass valve to close,
   causes the ultraviolet reactor to start ultraviolet treatment on the treatment target water passing through the ultraviolet reactor, while controlling the ultraviolet reactor so as to regulate the ultraviolet illuminance, and
   causes the outboard discharge valve to close to stop an outboard discharge via the outboard discharge line of the treatment target water that has passed through the ultraviolet reactor, and causes the ballast water pouring valve to open to pour the treatment target water into the ballast tank, when the illuminance detected by the ultraviolet irradiation sensor has reached a predetermined illuminance.

5. The ballast water treatment device according to claim 4, further comprising a flowmeter disposed on the downstream side of the ultraviolet reactor to detect a flow rate, wherein
   the controller causes the ultraviolet reactor to start the ultraviolet treatment on the treatment target water passing through the ultraviolet reactor when the flow rate detected by the flowmeter has reached a predetermined flow rate.

6. The ballast water treatment device according to claim 1, further comprising:
   an ultraviolet reactor for performing ultraviolet irradiation on the treatment target water filtered by the filter; and
   an ultraviolet irradiation sensor for detecting an ultraviolet illuminance in the ultraviolet reactor;
   wherein the vessel further includes an outboard discharge valve connected to the outboard discharge line, and a ballast water pouring valve which is located downstream of the ultraviolet reactor,
   wherein the bypass line is configured to discharge the treatment target water outboard while bypassing the filter and the ultraviolet reactor, and the outboard discharge line is configured to discharge outboard the treatment target water from a downstream side of the ultraviolet reactor; and wherein the controller
causes the outboard discharge valve to open to discharge outboard via the outboard discharge line the treatment target water which has passed through the filter and the ultraviolet reactor, when the controller causes the bypass valve to continue opening,
subsequently causes the bypass valve to close,
causes the ultraviolet reactor to start ultraviolet treatment on the treatment target water passing through the ultraviolet reactor, while controlling the ultraviolet reactor to regulate the ultraviolet illuminance, and
causes the outboard discharge valve to close to stop an outboard discharge via the outboard discharge line of the treatment target water that has passed through the ultraviolet reactor, and causes the ballast water pouring valve to open to pour the treatment target water into the ballast tank, when the illuminance detected by the ultraviolet irradiation sensor has reached a predetermined illuminance.

7. The ballast water treatment device according to claim 6, further comprising a flowmeter disposed on the downstream side of the ultraviolet reactor to detect a flow rate, wherein
the controller causes the ultraviolet reactor to start the ultraviolet treatment on the treatment target water passing through the ultraviolet reactor when the flow rate detected by the flowmeter has reached a predetermined flow rate.

8. A ballast water treatment device configured to provide a vessel with treated water, the vessel including a ballast water treatment line through which drawn treatment target water flows, a ballast tank and an outboard discharge line which are connected to a downstream side of the ballast water treatment line,
the ballast water treatment device comprising:
a filter disposed in the ballast water treatment line to filter the treatment target water;
a bypass line configured to bypass the filter;
a controller;
a water quality measurement device connected to the ballast water treatment line;
a treated water valve connected to the ballast water treatment line; and
a bypass valve connected to the bypass line, wherein
the controller causes the treated water valve to close and the bypass valve to open, such that the treatment target water is discharged outboard via the outboard discharge line from an upstream side of the filter, from a start of drawing of the treatment target water until a signal from the water quality measurement device reaches a predetermined value, and causes the bypass valve to remain open and the treated water valve to open.

9. The ballast water treatment device according to claim 8, wherein the water quality measurement device comprises a turbidity meter for measuring a turbidity of the drawn treatment target water, and
wherein the controller monitors the turbidity of the treatment target water measured by the turbidity meter, and determines that the signal reaches the predetermined value when the turbidity of the treatment target water has reached a predetermined turbidity.

10. The ballast water treatment device according to claim 8, wherein the controller comprises a timer and
the controller determines that the signal reaches the predetermined value when a predetermined time counted by the timer has elapsed since the start of drawing of the treatment target water.

11. The ballast water treatment device according to claim 8, further comprising:
an ultraviolet reactor for performing ultraviolet irradiation on the treatment target water filtered by the filter; and
an ultraviolet irradiation sensor for detecting an ultraviolet illuminance in the ultraviolet reactor;
wherein the vessel further includes an outboard discharge valve connected to the outboard discharge line, and a ballast water pouring valve which is located downstream of the ultraviolet reactor,
wherein the bypass line is configured to discharge the treatment target water outboard while bypassing the filter and the ultraviolet reactor, and the outboard discharge line is configured to discharge outboard the treatment target water from a downstream side of the ultraviolet reactor; and
wherein the controller
causes the outboard discharge valve to open to discharge outboard via the outboard discharge line the treatment target water which has passed through the filter and the ultraviolet reactor, after the controller causes the bypass valve to close,
causes the ultraviolet reactor to start ultraviolet treatment on the treatment target water passing through the ultraviolet reactor, while controlling the ultraviolet reactor so as to regulate the ultraviolet illuminance, and
causes the outboard discharge valve to close to stop an outboard discharge via the outboard discharge line of the treatment target water that has passed through the ultraviolet reactor, and causes the ballast water pouring valve to open to pour the treatment target water into the ballast tank, when the illuminance detected by the ultraviolet irradiation sensor has reached a predetermined illuminance.

12. The ballast water treatment device according to claim 11, further comprising a flowmeter disposed on the downstream side of the ultraviolet reactor to detect a flow rate, wherein
the controller causes the ultraviolet reactor to start the ultraviolet treatment on the treatment target water passing through the ultraviolet reactor when the flow rate detected by the flowmeter has reached a predetermined flow rate.

13. The ballast water treatment device according to claim 8, further comprising:
an ultraviolet reactor for performing ultraviolet irradiation on the treatment target water filtered by the filter; and
an ultraviolet irradiation sensor for detecting an ultraviolet illuminance in the ultraviolet reactor;
wherein the vessel further includes an outboard discharge valve connected to the outboard discharge line, and a ballast water pouring valve which is located downstream of the ultraviolet reactor,
wherein the bypass line is configured to discharge the treatment target water outboard while bypassing the filter and the ultraviolet reactor, and the outboard discharge line is configured to discharge outboard the treatment target water from a downstream side of the ultraviolet reactor; and
wherein the controller
causes the outboard discharge valve to open to discharge outboard via the outboard discharge line the treatment target water which has passed through the filter and the ultraviolet reactor, when the controller causes the bypass valve to continue opening, subsequently causes the bypass valve to close, causes the ultraviolet reactor to start ultraviolet treatment on the treatment target water passing through the ultraviolet reactor, while controlling the ultraviolet reactor to regulate the ultraviolet illuminance, and causes the outboard discharge valve to close to stop an outboard discharge via the outboard discharge line of the treatment target water that has passed through the ultraviolet reactor, and causes the ballast water pouring valve to open to pour the treatment target water into the ballast tank, when the illuminance detected by the ultraviolet irradiation sensor has reached a predetermined illuminance.

14. The ballast water treatment device according to claim 13, further comprising a flowmeter disposed on the downstream side of the ultraviolet reactor to detect a flow rate, wherein the controller causes the ultraviolet reactor to start the ultraviolet treatment on the treatment target water passing through the ultraviolet reactor when the flow rate detected by the flowmeter has reached a predetermined flow rate.

\* \* \* \* \*